(12) United States Patent
Södö et al.

(10) Patent No.: US 8,736,204 B2
(45) Date of Patent: May 27, 2014

(54) TRANSFER APPARATUS FOR ELECTRIC POWER

(75) Inventors: Nicklas Södö, Vaasa (FI); Risto Komulainen, Klaikkala (FI)

(73) Assignee: Vacon Oyj, Vaasa (FI)

( * ) Notice: Subject to any disclaimer, the term of this patent is extended or adjusted under 35 U.S.C. 154(b) by 261 days.

(21) Appl. No.: 13/342,467

(22) Filed: Jan. 3, 2012

(65) Prior Publication Data

US 2012/0181955 A1 Jul. 19, 2012

(30) Foreign Application Priority Data

Jan. 19, 2011 (FI) .................................. 20115050

(51) Int. Cl.
*H02P 3/06* (2006.01)

(52) U.S. Cl.
USPC ........... 318/375; 318/280; 318/703; 318/757; 318/494; 318/362; 307/127; 363/56.12; 363/37; 363/40; 363/45; 363/47

(58) Field of Classification Search
CPC .......... H02M 5/458; H02M 7/49; H02P 25/22
USPC ........ 363/56.12, 56.02, 56.09, 34, 37, 39, 40, 363/45, 46, 47; 318/375, 376, 362, 703, 318/757, 494; 307/127
See application file for complete search history.

(56) References Cited

U.S. PATENT DOCUMENTS

| | | | |
|---|---|---|---|
| 5,625,545 A | 4/1997 | Hammond | |
| 6,229,722 B1 * | 5/2001 | Ichikawa et al. | 363/71 |
| 7,423,412 B2 * | 9/2008 | Weng et al. | 322/20 |
| 7,830,681 B2 * | 11/2010 | Abolhassani et al. | 363/37 |
| 7,863,766 B2 * | 1/2011 | Abolhassani et al. | 290/44 |
| 7,940,537 B2 * | 5/2011 | Abolhassani et al. | 363/65 |
| 8,045,346 B2 * | 10/2011 | Abolhassani et al. | 363/37 |
| 8,129,853 B2 * | 3/2012 | Abolhassani et al. | 290/44 |
| 8,130,501 B2 * | 3/2012 | Ledezma et al. | 361/727 |
| 8,223,515 B2 * | 7/2012 | Abolhassani et al. | 363/65 |
| 8,279,640 B2 * | 10/2012 | Abolhassani et al. | 363/37 |
| 8,553,432 B2 * | 10/2013 | Komulainen et al. | 363/35 |
| 8,575,479 B2 * | 11/2013 | Abolhassani et al. | 174/50 |
| 2001/0019253 A1 | 9/2001 | Hammond et al. | |
| 2007/0064366 A1 | 3/2007 | Hammond | |
| 2010/0327793 A1 | 12/2010 | Komulainen et al. | |

* cited by examiner

*Primary Examiner* — Rita Leykin
(74) *Attorney, Agent, or Firm* — Birch, Stewart, Kolasch & Birch, LLP (57) ABSTRACT

Apparatus for transferring power between an electricity network ($U_P$) operating on alternating-current electricity and a multiphase electric machine (M2, M3), which apparatus comprises low-voltage power cells ($C_S, C_{11} \ldots C_{N6}$) operating on a cascade principle, which power cells comprise a single-phase output connector (OUT), and at least one transformer ($T_A, T_1 \ldots T_N$), comprising for each power cell connected to it a single-phase or multiphase winding dedicated to the specific power cell, which transformer comprises at least one additional winding ($W_A, W_{B1} \ldots W_{BN}$) connected to the same magnetic circuit as the other windings for the purpose of at least one auxiliary circuit, which can be connected to the aforementioned additional winding.

20 Claims, 5 Drawing Sheets

TRANSFER APPARATUS FOR ELECTRIC POWER

FIELD OF TECHNOLOGY

The object of the present invention is a transfer apparatus for electric power for transferring power between two electricity networks or between an electricity network and a multiphase electric machine, which apparatus comprises low-voltage power cells and one or more transformers, to which the power cells are connected.

PRIOR ART AND DESCRIPTION OF PROBLEM

A medium-voltage network refers to an electricity distribution network of over 1 kV that is used in the transmission of electrical energy e.g. between a high-voltage (over 36 kV) main grid and a low-voltage (below 1 kV) consumer network. Electricity distribution networks normally operate with 50/60 Hz alternating-current electricity.

It is known in the art that it is advantageous to use medium-voltage in heavy-duty, such as over 1 MW, electrical devices owing to the smaller current and, as a consequence of this, smaller power losses. Often some kind of adjuster is needed between an electrical device, such as an electric machine, and an electricity distribution network, owing to the different frequencies, the different voltage levels or the need for galvanic isolation. It is known in the art that the adjustment needed can be arranged advantageously by means of a transformer and a power converter, e.g. a frequency converter.

The voltage endurance of the switch-type power semiconductor components generally used in frequency converters is, for reasons of manufacturing technology, so small that with medium-voltage a number of them must be connected in series. It is known in the art that to avoid the problems related to the serial connection of components, low-voltage frequency converter technology can be utilized by the aid of a so-called cascade circuit, wherein an adequate amount of low-voltage power cells are connected in series for achieving sufficient total voltage endurance. The circuit also comprises a transformer, which comprises its own winding per each power cell belonging to the power converter. Examples of cascade circuits are found e.g. in U.S. Pat. No. 5,625,545, in the solution according to which a transformer operates at the frequency of the supply network and all its windings are three-phase, and in patent publication US 2010/0327793, in the solution according to which a transformer operates at a high frequency, over 1 kHz, and all its windings are single-phase.

Disturbances, such as transient voltage outages, sometimes occur in electricity distribution networks. A process operating on electrical power loses its controllability in such a situation, owing to which it is normally desired to halt the process as quickly as possible. For example, in the case of a motor supplied with a frequency converter, this means that the speed of rotation is controlled towards zero, when the operating point of the motor can turn to the generator side, i.e. it starts to supply power towards the frequency converter. For preventing internal overvoltage in this type of situation, a frequency converter is often provided with a so-called brake chopper, by means of which the generator power can be supplied to a resistor. In a cascade-type frequency converter the implementation of dynamic braking is awkward and expensive for, inter alia, insulation reasons, because according to prior art each power cell must be provided with its own resistor brake.

The power cells comprised in a cascade circuit are known to operate on the so-called PWM principle, according to which they comprise a DC intermediate circuit provided with a high-capacitance filter capacitor. For preventing a large switching current surge, these types of capacitors must be charged to almost full voltage before connecting the device to the supply network. According to prior art e.g. a second circuit-breaker and charging resistors connected in parallel with the main breaker are used for this purpose, which raise the costs. In the so-called dual-cascade circuit according to patent publication US 2010/0327793, by means of a resistor it is possible to charge only the power cells disposed on the primary side of the transformer.

SUMMARY OF THE INVENTION

The aim of this invention is to achieve a new kind of arrangement, with which the aforementioned drawbacks are avoided and with which both dynamic braking as well as initial charging of the filter capacitors of the power cells are advantageously enabled. In addition, the invention makes possible a test arrangement, in which the operability of medium-voltage circuits can be verified without a direct connection to a medium-voltage network, which can be useful e.g. when commissioning apparatus.

With the apparatus according to the invention electric power can be transferred between a first multiphase power circuit, e.g. a power circuit of a cascaded power converter, connected to a multiphase transformer and a second single-phase or multiphase power circuit (auxiliary circuit) connected to the same transformer by means of a separate additional winding. More particularly, the apparatus that is object of the invention is suited for use between a cascaded power converter operating in a medium-voltage environment and power circuits (auxiliary circuits) operating in a low-voltage environment.

The invention is suited for use between any two electricity networks fitted together by means of a cascade converter, such as e.g.:
  Between an alternating-current electricity network or direct-current electricity network and an electric motor operating on alternating-current electricity,
  Between two alternating-current electricity networks of different voltages and/or of different frequencies,
  Between an alternating-current electricity network and a direct-current electricity network.

In the solution according to the invention, a transformer comprised in a cascade-type converter comprises an additional winding, which can be low-voltage and dimensioned for a smaller power than the actual main windings comprised in the converter. In a transformer solution (U.S. Pat. No. 5,625,545) operating at the frequency of the supply network, the additional winding can be either single-phase or three-phase, and in a high-frequency transformer solution (US 2010/0327793) the additional winding is always single-phase. The additional winding is in the same magnetic circuit as also the windings connected to the power cells of the cascade converter, so that its voltage in relation to the number of winding turns is proportional to the voltages of the other windings.

According to one embodiment of the invention a brake circuit is connected to the additional winding, which brake circuit, comprises e.g. a rectifier, a filter capacitor for direct-current voltage, and also a brake chopper and a brake resistor. When the supply network drops, the power cells of the cascade converter can in this case supply their braking power via the additional winding to the brake circuit, which can be common to all the power cells. The brake circuit preferably operates in a low-voltage environment, in which case inexpensive components are available for it and the insulation of it is easier with regard to electrical safety than with medium-voltage.

According to one embodiment of the invention a power supply circuit is connected to the additional winding, which power supply circuit comprises e.g. a rectifier connected to a single-phase or three-phase low-voltage network, a filter capacitor for direct-current voltage, and also an inverter bridge implemented with controllable power semiconductor switches. The power supply circuit can in this case charge the filter capacitors of the power cells of the cascade converter to the desired voltage before connection of the converter to a medium-voltage supply network. Charging can take place by controlling on the PWM principle the magnitude of the voltage formed by the change-over switches to increase from zero towards final full voltage, following the rise of which voltage also the DC intermediate circuits of the power cells almost charge. The power supply circuit and the brake circuit can be connected to a common direct-current voltage.

According to one embodiment of the invention the circuits disposed on the primary side of the transformer are connected to the circuits disposed on the secondary side of the transformer e.g. via a filter. After the power supply circuit described above has charged, the voltages of the DC intermediate circuits of the power cells to the normal operating level, e.g. the cascade converter disposed on the secondary side of the transformer can be started to supply power to the circuits disposed on the primary side. In this case the power supply circuit remains to supply to the system the total dissipated power formed in it, in which case e.g. the medium-voltage primary circuits and secondary circuits can be tested at up to full power without a direct interface to the supply network.

The characteristic features of the solution according to the invention are described in detail in the claims below.

SHORT DESCRIPTION OF THE DRAWINGS

In the following, the invention will be described in more detail by the aid of some examples of its embodiments with reference to the attached drawings, wherein.

DETAILED DESCRIPTION OF THE INVENTION

Figure 1:
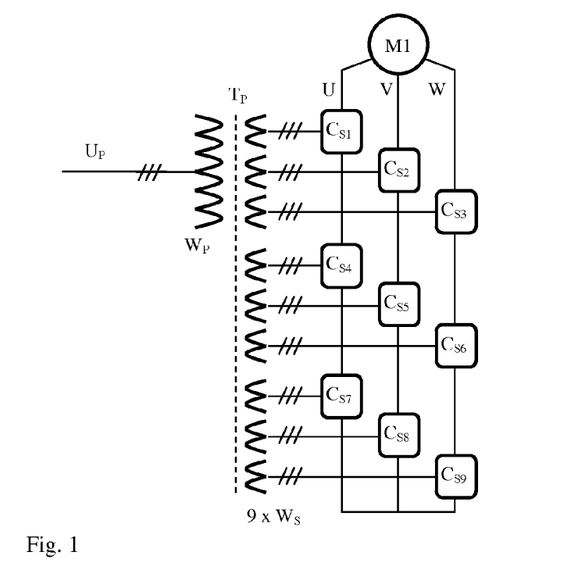
FIG. 1 presents a prior-art cascade circuit between an electric machine and a medium-voltage network.

FIG. 1 describes a basic circuit of so-called cascaded frequency converter known in the art, the operation of which type of circuit is known from e.g. U.S. Pat. No. 5,625,545. It normally comprises both medium voltages as well as the three-phase supply voltage $U_P$, the frequency of which is normally 50 Hz or 60 Hz, and also three-phase output voltage U, V, W adjustable in frequency and magnitude for supplying an electric machine M1. The frequency converter comprises similar low-voltage power cells $C_{S1}$ ... $C_{S9}$, a number of which are connected in series in each output phase. The power cells are connected to a common transformer $T_P$, the three-phase primary coil $W_P$ of which is connected to the supplying medium-voltage network $U_P$, and which transformer comprises a separate three-phase low-voltage secondary coil $W_S$ per each power cell. Differing from the embodiment of the figure, the secondary windings can also be single-phase. The number of power cells connected in series depends as is known on the output voltage, in the embodiment of FIG. 1 there are 3 power cells in series, in which case there are correspondingly 9 secondary windings. The more groups connected in series that are used, the more steps the pulse pattern of the output voltage can be comprised of, which has an advantageous effect on the harmonics content of the output voltage.

Figure 2A:
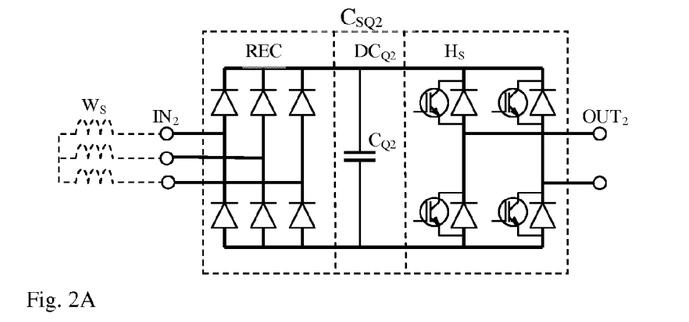
FIGS. 2A and 2B present the power cells of a prior-art cascade circuit.

FIG. 2A presents an example of a circuit of a power cell $C_S$, which type of power cell $C_{SQ2}$ it is known can be used when the direction of flow of the power is just from the supply network towards the motor. The three-phase secondary winding $W_S$ of the transformer, which winding is connected to the supply connectors $IN_2$, supplies the power cell. The power cell comprises a three-phase rectifying bridge REC comprising diodes, a filter capacitor $C_{Q2}$ of direct-current voltage $DC_{Q2}$ and also a single-phase inverting bridge $H_S$, which comprises two so-called phase switches comprising controllable power semiconductor switches, e.g. IGBT, and diodes, which phase switches can be connected to either pole whatsoever of an output connector $OUT_2$ of either direct-current voltage pole whatsoever.

Figure 2B:
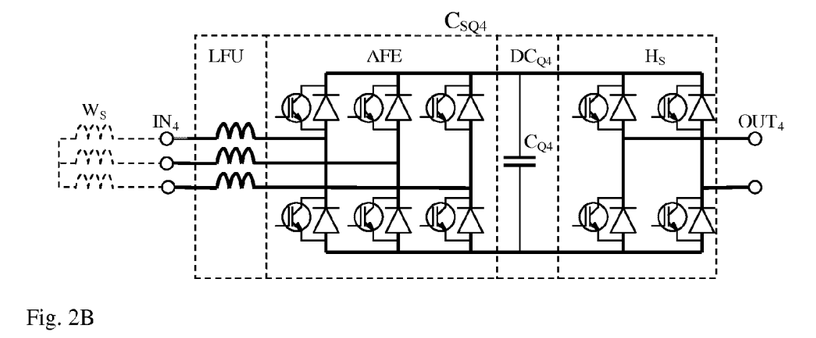

When power can flow in either direction whatsoever, it is known to use the possibility $C_{SQ4}$ described in FIG. 2B. In it an active network bridge AFE is used in place of a so-called passive network bridge REC, which active bridge comprises in this embodiment three similar phase switches, which are also used in the inverting bridge $H_S$. A filter unit LFU can be connected between the secondary winding $W_S$ to be supplied and the AFE bridge, for damping the harmonics of the current. By using an AFE bridge, it is known in the art that apart from being able to supply braking power to the network, also an almost sinusoidal waveform of the network current can be achieved.

Figure 3:
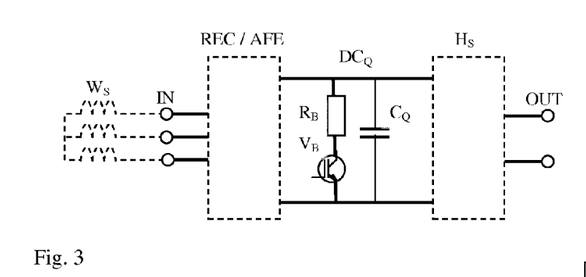
FIG. 3 presents a dynamic brake of a prior-art cascade circuit.

FIG. 3 presents a possibility according to prior art to arrange dynamic braking, which is needed e.g. when the voltage of the supply network has disconnected owing to a disturbance and it is desired to stop a process as quickly as possible. The circuit comprises a controllable power switch $V_B$, e.g. an IGBT, and a resistor $R_B$, which are connected in parallel with the direct-current voltage filter capacitor $(C_Q)$ of a power cell $(C_{SQ2}, C_{SQ4})$. In a braking situation the power switch $V_B$ is controlled to be conductive, in which case dissipation power braking the electric motor forms in the resistor according to the control of the direct-current voltage $DC_Q$ and the power switch. Dynamic braking circuits are needed in each power cell, which is a problem from the viewpoint both of costs and of electrical insulation of the resistors.

Figure 4:
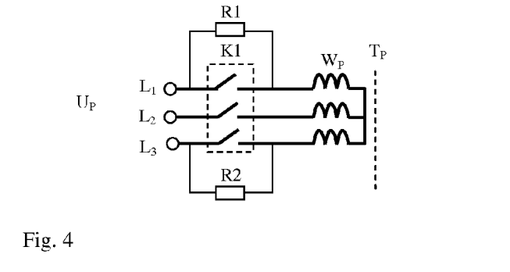
FIG. 4 presents a charging arrangement of a prior-art cascade circuit.

The power cells comprised in a cascade circuit are known to comprise a DC intermediate circuit provided with a high-capacitance filter capacitor. For preventing a large switching current surge these types of capacitors must be charged to almost full voltage before connection of the device to the supply network. FIG. 4 contains an example of a prior-art charging arrangement, which comprises a charging contactor K1 and charging resistors R1, R2 connected to the primary circuit of the transformer. At first, when the capacitors $C_Q$ of the power cells are de-energized, the contacts of the contactor K1 are open. When the supply voltage $U_P$ is connected to the input connectors $L_1$, $L_2$, $L_3$ and onwards to the contactor, the current supplied via the resistors $R_1$ and $R_2$, the transformer $T_P$ and also the diodes of the network bridges (REC, AFE) of the power cells $C_S$ charges the filter capacitors $C_Q$. When the capacitors have charged to almost full voltage, the contacts of the contactor K1 can be closed, in which case normal operation can start.

The charging circuits K1, R1, R2 and the control circuits of the contactor are medium-voltage, which is a problem from the viewpoint both of costs and of electrical insulation.

Figure 5A:
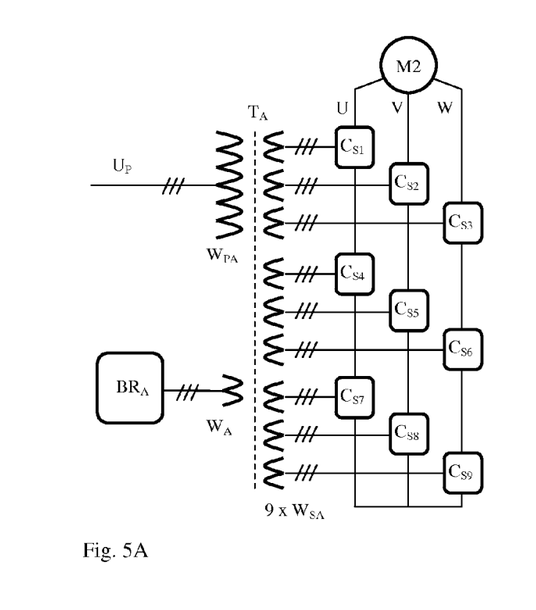
FIGS. 5A and 5B present a dynamic brake of a cascade circuit according to the invention.

FIG. 5A presents a solution according to the invention for arranging dynamic braking in a cascade converter according to FIG. 1. The power cells are connected to a common transformer $T_A$, the three-phase primary winding $W_{PA}$ of which is connected to the medium-voltage network $U_P$ to be supplied, and which transformer comprises a separate three-phase low-voltage secondary winding $W_{SA}$ per each power cell. The cascade transformer $T_A$ according to the invention comprises an additional winding $W_A$ to which a brake unit $BR_A$ is connected. The additional winding $W_A$ is, according to the figure, preferably three-phase, but it is possible for it to be single-phase.

Figure 5B:
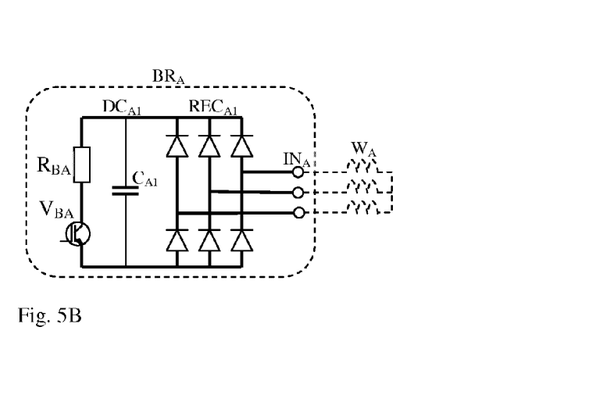

FIG. 5B contains a more detailed example of a brake unit $BR_A$, in which the voltage of the additional winding is rectified in a diode bridge $REC_{A1}$ into direct-current voltage $DC_{A1}$, which can be filtered with a capacitor $C_{A1}$. The actual brake circuit comprises a resistor $R_{BA}$ and a controllable power switch $V_{BA}$, which is controlled in the same way as is presented above in connection with FIG. 3.

In the arrangement according to the invention all the power cells can supply their braking energy to the same common brake unit. The brake circuit is preferably low-voltage, in which case correspondingly inexpensive components can be used in it as well as in the power cells, and the insulation of it is easier with regard to electrical safety than with medium-voltage.

Figure 5C:
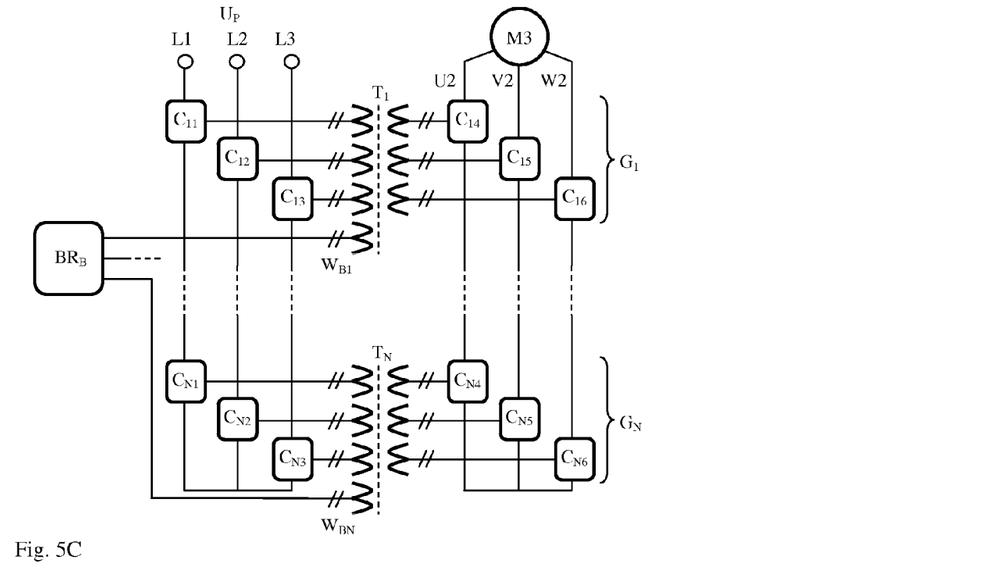
FIGS. 5C and 5D present a second dynamic brake of a cascade circuit according to the invention.

FIG. 5C presents a solution according to the invention for arranging dynamic braking in a so-called dual-cascade circuit, a type of which is presented in, inter alia, patent publication US 2010/0327793. The dual-cascade circuit comprises groups $G_1 \ldots G_N$ connected in series, each of which groups comprising its own transformers $T_1 \ldots T_N$, operating at a frequency of over 1 kHz, and cascaded similar power cells $C_{11} \ldots C_{N6}$ on both sides of them. One example of the internal circuit of a power cell $C_{11}$ is presented in FIG. 6. According to the invention, each group-specific transformer ($T_1 \ldots T_N$) comprises a single-phase additional winding ($W_{S1} \ldots W_{BN}$), which can be connected either to a brake unit $BR_B$ common to all the groups, according to the preferred embodiment of the figure, or to a brake unit specific to the individual group.

Figure 5D:
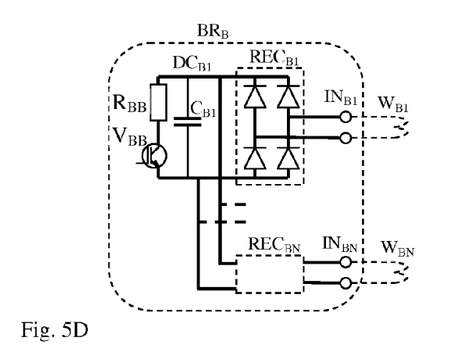

According to the embodiment of FIG. 5D, the brake unit comprises for each group-specific additional winding its own rectifying bridge ($REC_{B1} \ldots REC_{BN}$), a filter capacitor $C_{B1}$ of direct-current voltage $DC_{B1}$ and also a brake resistor $R_{BB}$ and a power switch $V_{BB}$, which is controlled in the same way as is presented above in connection with FIG. 3. The additional winding and the brake unit are low-voltage according to the preferred dimensioning.

Figure 6:
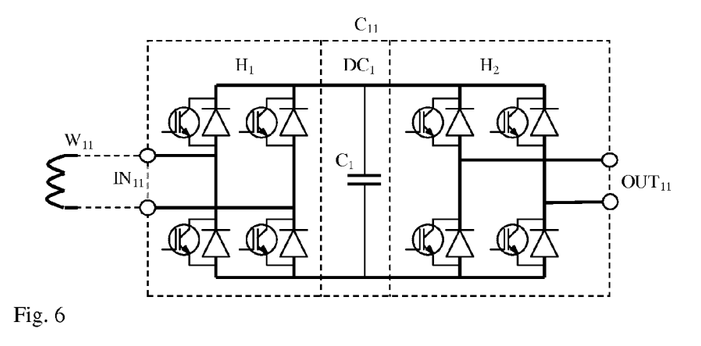
FIG. 6 presents a power cell of a prior-art cascade circuit.

FIG. 6 contains an example of a power cell $C_{11}$ of a dual-cascade circuit. It comprises a single-phase bridge circuit $H_1$ to be connected to a transformer, a filter capacitor $C_1$ of the DC intermediate circuit $DC_1$ and a single-phase inverter bridge $H_2$. Both the so-called H-bridge circuits $H_1$ and $H_2$ are comprised of similar phase switches, which are presented above in connection with FIG. 2A. As is obvious to a person skilled in the art, the power cell presented by FIG. 6 can transfer power in either direction, from the input connectors $IN_{11}$ to the output connectors $OUT_{11}$, or vice versa.

Figure 7A:
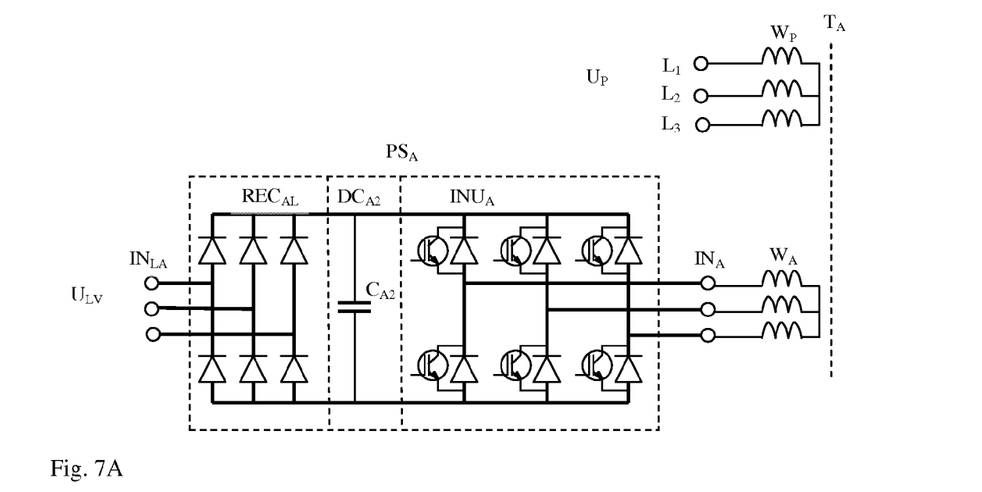
FIGS. 7A and 7B present a charging arrangement of a cascade circuit according to the invention.

FIG. 7A presents a solution according to the invention for arranging initial charging in a cascade converter according to FIG. 1. The cascade transformer $T_A$ according to the invention comprises an additional winding $W_A$ to which a power supply unit $PS_A$ is connected. The additional winding $W_A$ is, according to the figure, preferably three-phase, but it is possible for it to be single-phase. The supply voltage $U_{LV}$ of the power supply unit $PS_A$, which voltage is preferably low-voltage 50/60 Hz distribution voltage, is rectified in a diode bridge $REC_{AP}$ into direct-current voltage $DC_{A2}$, which can be filtered with a capacitor $C_{A2}$. According to the embodiment of the figure, the unit also comprises a three-phase inverter bridge $INU_A$, which comprises three phase switches comprising controllable power semiconductor switches and diodes. The output connectors $IN_A$ of the phase switches can be connected, either directly or via a filter (such as LFU in FIG. 2B), to the additional winding $W_A$. The initial charging of the filter capacitors of the power cells, e.g. $C_{S1}$, of the cascade converter occurs such that the bridge $INU_A$ forms on the prior-art PWM principle a three-phase rising voltage, which via the transformer $T_A$ and rectified by the diodes (REC or AFE, FIGS. 2A, 2B) of the network bridges of the power cells $C_S$ charges the filter capacitors.

Figure 7B:
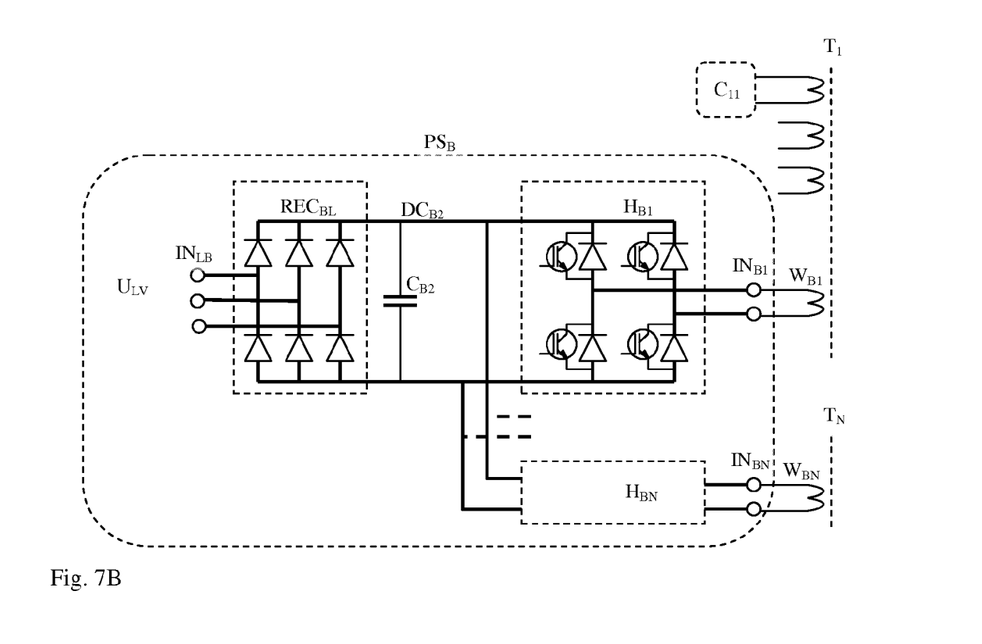

FIG. 7B presents how initial charging according to the invention can be arranged in a dual-cascade converter. According to the invention, each group-specific transformer ($T_1 \ldots T_N$) comprises a single-phase additional winding ($W_{B1} \ldots W_{BN}$), which can be connected either to a power supply unit $PS_B$ common to all the groups, according to the preferred embodiment of the figure, or to a power supply unit specific to the individual group. The supply voltage $U_{LV}$ of the power supply unit $PS_B$, which voltage is preferably low-voltage 50/60 Hz distribution voltage, is rectified in a diode bridge $REC_{BL}$ into direct-current voltage $DC_{B2}$, which can be filtered with a capacitor $C_{B2}$. In the embodiment of the figure, the power supply unit comprises for each group-specific additional winding its own inverter bridge ($H_{B1} \ldots H_{BN}$) comprising two change-over switches. The initial charging of the filter capacitors of the power cells, e.g. $C_{11}$, of the cascade converter occurs such that the inverter bridges $H_B$ form on the prior-art PWM principle single-phase rising voltages specific for each group, which voltages via the transformers $T_1 \ldots T_N$ and rectified by the diodes of the network bridges (such as $H_1$ in the embodiment of FIG. 6) of the power cells charge the filter capacitors.

Figure 8:
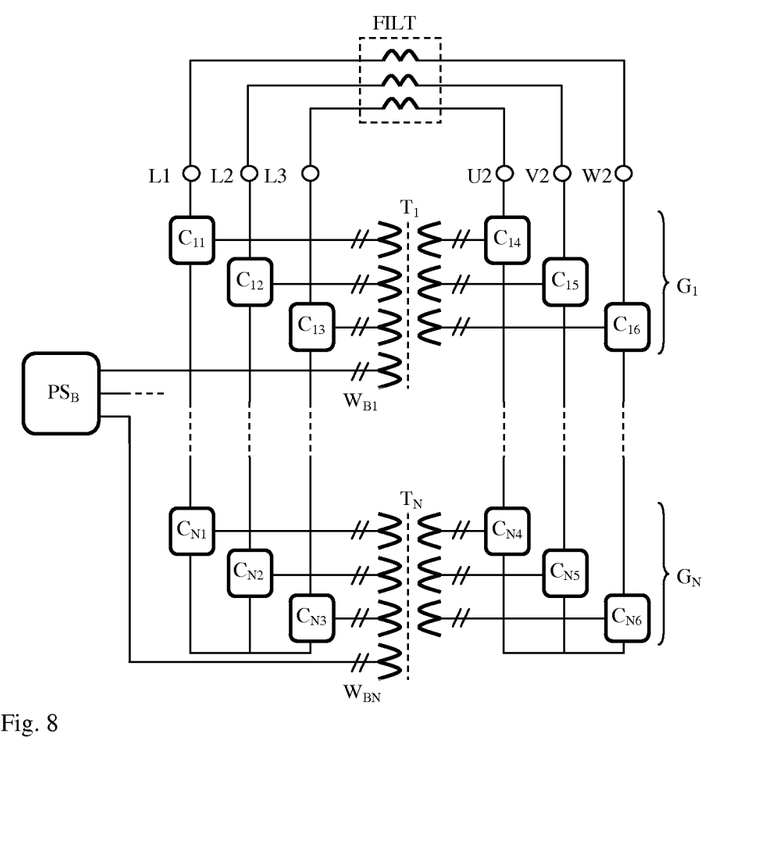
FIG. 8 presents a testing situation of a cascade circuit according to the invention.

FIG. 8 presents how the invention can be applied in the testing of a dual-cascade converter. According to the figure the input connectors (L1, L2, L3) of the converter are connected with the output connectors (U2, V2, W2) via a filter unit FILT. When it is assumed that the internal DC circuits of the power cells $C_{11} \ldots C_{N6}$ are fully charged, the cascaded power cells can form the nominal voltages for both the input side and the output side on the PWM principle. By adjusting the phase shift between the voltages, it is possible to adjust the magnitude of the current flowing through the filter unit, i.e. the load current of the converter. In this way the converter can be tested at even up to rated current without a connection to the actual supply network.

According to the invention, via the additional windings ($W_{B1} \ldots W_{BN}$) of the group-specific transformers ($T_1 \ldots T_N$) in this type of test arrangement, only the dissipation power consumed by the system is supplied to the system, by the action of the power supply unit presented above in connection with FIG. 7B. As a result of the invention a medium-voltage power converter can be tested with full voltage and current without a direct connection to a medium-voltage network, which is a great advantage in, inter alia, field conditions.

As the person skilled in the art will note, the power supply units $PS_A$, $PS_B$ presented in FIGS. 7A and 7B can also handle the rectifying functions ($REC_{A1}$, $REC_B$) required by dynamic braking, when the power semiconductor switches controlling the inverter bridges ($INU_A$, $H_B$) are left uncontrolled and the dynamic braking circuit presented in FIG. 3 is connected to the DC intermediate circuits $DC_{A2}$, $DC_{B2}$ of them. A person skilled in the art will also note that the circuit diagram of FIG. 7A presents a normal PWM frequency converter, the type of which can be used according to the invention connected to the additional winding to handle both the dynamic braking functions and the power supply functions.

It is obvious to the person skilled in the art that the different embodiments of the invention are not limited solely to the examples described above, but that they may be varied within the scope of the claims presented below.

The invention claimed is:

1. An apparatus for transferring power between an electricity network operating on alternating-current electricity and a multiphase electric machine the apparatus comprising:
   low-voltage power cells operating on a cascade principle, the power cells comprising a single-phase output connection, and at least one transformer comprising, for each of the power cells, a single-phase or multiphase winding dedicated to the each power cell,
   the at least one transformer comprising at least one additional winding connected to a same magnetic circuit as the single-phase or multiphase winding for the purpose of at least one auxiliary circuit, which is connected to the at least one additional winding,
   wherein the auxiliary circuit is a power supply unit comprising one or more controllable power switches,
   wherein the power supply unit is configured to form, via the one or more controllable power switches, a rising voltage with a pulse-width modulation (PWM) principle to charge one of filter capacitors of the power cells, a brake circuit among one or more brake circuits, and both the filter capacitors of the power cells and the brake circuit, and
   wherein the brake circuit is configured to operate such that when a supply network drops, the power cells supply braking power via the at least one additional winding to the one or more brake circuits.

2. Apparatus according to claim 1, wherein the at least one additional winding is low-voltage.

3. Apparatus according to claim 1, wherein the at least one transformer operates on a supply network frequency, and the at least one additional winding is single-phase or three-phase.

4. Apparatus according to claim 1, wherein the at least one transformer operates at a frequency of over 1 kHz and the at least one additional winding is single-phase.

5. Apparatus according to claim 1, wherein, when the supply network drops, the cascaded power cells supply braking power via the at least one additional winding to the one or more brake circuits.

6. Apparatus according to claim 5, wherein the brake circuit comprises a rectifier rectifying a voltage of the at least one additional winding, a filter capacitor of direct-current voltage, and a brake chopper and a brake resistor.

7. Apparatus according to claim 1, wherein the at least one auxiliary circuit is a power supply circuit configured to operate such that it charges the filter capacitors of the cascaded power cells via the at least one additional winding to a desired voltage before connection of the cascaded power cells to a medium-voltage supply network.

8. Apparatus according to claim 7, wherein the power supply circuit comprises the cascaded power cells, DC intermediate circuits, and at least one inverter bridge operating on the PWM principle to form a voltage to increase from zero towards a final full voltage, and
   wherein, following the rise of the voltage formed by operating the at least one inverter bridge on the PWM principle, the DC intermediate circuits of the power cells charge.

9. Apparatus according to claim 8, wherein the power supply circuit receives its supply power from a single-phase or three-phase low-voltage network.

10. Apparatus according to claim 7, wherein the power supply circuit is configured to supply via the at least one additional winding dissipated power in a testing circuit, in which the circuits disposed on a primary side of transformers of the cascaded power cells are connected to the circuits disposed on a secondary side of the transformers via a filter.

11. Apparatus according to claim 1,
    further comprising:
    a power supply circuit comprising the cascaded power cells,
    wherein the power supply circuit and the brake circuit are connected to a common direct-current voltage.

12. Apparatus according to claim 6, wherein a dynamic braking circuit is arranged in a dual-cascade circuit comprising the cascaded power cells, which are connected in series to form groups, each of the groups of series connected cascaded power cells comprising transformers and the cascaded power cells on both sides of the transformers, and
    wherein each of the transformers comprises a single-phase additional winding, which is connected to a brake unit common to all the groups, or a brake unit specific to an individual group.

13. Apparatus according to claim 9, wherein the power supply circuit is arranged in a dual-cascade circuit comprising the cascaded power cells, which are connected in series to form groups, each of the groups of series connected cascaded power cells comprising transformers, and
    wherein each of the transformers comprises a single-phase additional winding, which is connected to a power supply unit common to all the groups, or a power supply unit specific to an individual group.

14. Apparatus according to claim 2, wherein the at least one transformer operates on a supply network frequency, and the at least one additional winding is either single-phase or three-phase.

15. Apparatus according to claim 2, wherein the at least one transformer operates at a frequency of over 1 kHz and the at least one additional winding is single-phase.

16. Apparatus according to claim 2, wherein, when the supply network drops, the cascaded power cells supply braking power via the at least one additional winding to the one or more brake circuits.

17. Apparatus according to claim 3, wherein, when the supply network drops, the cascaded power cells supply braking power via the at least one additional winding to the one or more brake circuits.

18. Apparatus according to claim 4, wherein, when the supply network drops, the cascaded power cells supply braking power via the at least one additional winding to the one or more brake circuits.

19. Apparatus according to claim 2, wherein the at least one auxiliary circuit is a power supply circuit configured to operate such that it charges the filter capacitors of the cascaded power cells via the additional winding to a desired voltage before connection of the cascaded power cells to a medium-voltage supply network.

20. Apparatus according to claim 3, wherein the at least one auxiliary circuit is a power supply circuit configured to operate such that it charges the filter capacitors of the cascaded power cells via the at least one additional winding to a desired voltage before connection of the cascaded power cells to a medium-voltage supply network.

* * * * *